United States Patent

[11] 3,562,524

| [72] | Inventors | Donald F. Moore; |
| | | Walter S. Beeman, Liverpool, N.Y. |
| [21] | Appl. No. | 782,964 |
| [22] | Filed | Dec. 11, 1968 |
| [45] | Patented | Feb. 9, 1971 |
| [73] | Assignee | General Electric Company |
| | | a corporation of New York |

[54] APPARATUS FOR MEASURING THE CONCENTRATION OF ALCOHOL VAPOR IN ALVEOLAR AIR
13 Claims, 4 Drawing Figs.

| [52] | U.S. Cl. | 250/43.5 |
| [51] | Int. Cl. | G01n 21/26 |
| [50] | Field of Search | 250/43.5 |

[56] References Cited
UNITED STATES PATENTS

| 2,967,451 | 1/1961 | Farrall | 250/43.5 |
| 3,162,761 | 12/1964 | Luft | 250/43.5 |
| 3,194,962 | 7/1965 | Carlon et al. | 250/43.5 |
| 3,319,071 | 5/1967 | Werth et al. | 250/43.5 |

*Primary Examiner*—James W. Lawrence
*Assistant Examiner*—C. E. Church
*Attorneys*—Richard V. Lang, Marvin A. Goldenberg, Frank L. Neuhauser, Oscar B. Waddell and Melvin M. Goldenberg

ABSTRACT: Apparatus for measuring the concentration of ethyl alcohol in alveolar air, and depending upon the unique infrared absorption characteristics of ethyl alcohol vapor is disclosed. Infrared radiation of two spectral selections—one strongly absorbed and the other relatively unabsorbed—is introduced in sequence into an absorption chamber containing alcohol vapor. The sequenced illumination is balanced in an electrical comparator in the absence of alcohol and imbalance is used to measure the concentration of alcohol vapor within the chamber.

The absorption chamber forms a light-integrating sphere to multiply the infrared absorption path length and to provide a uniform level of interior illumination. The single source of illumination of the chamber is focused into two separated beams by means of a split ellipsoidal mirror into which separate relatively small and simple filters may be introduced. The optical paths through the chamber to the simple detector are balanced by the integrating effect of the sphere. Filters employing vinylidene chloride-vinyl chloride copolymer, crystalline calcium fluoride and polytrifluoromonochloroethylene are treated. Simple self-calibration means are provided. The apparatus is applicable to law enforcement problems.

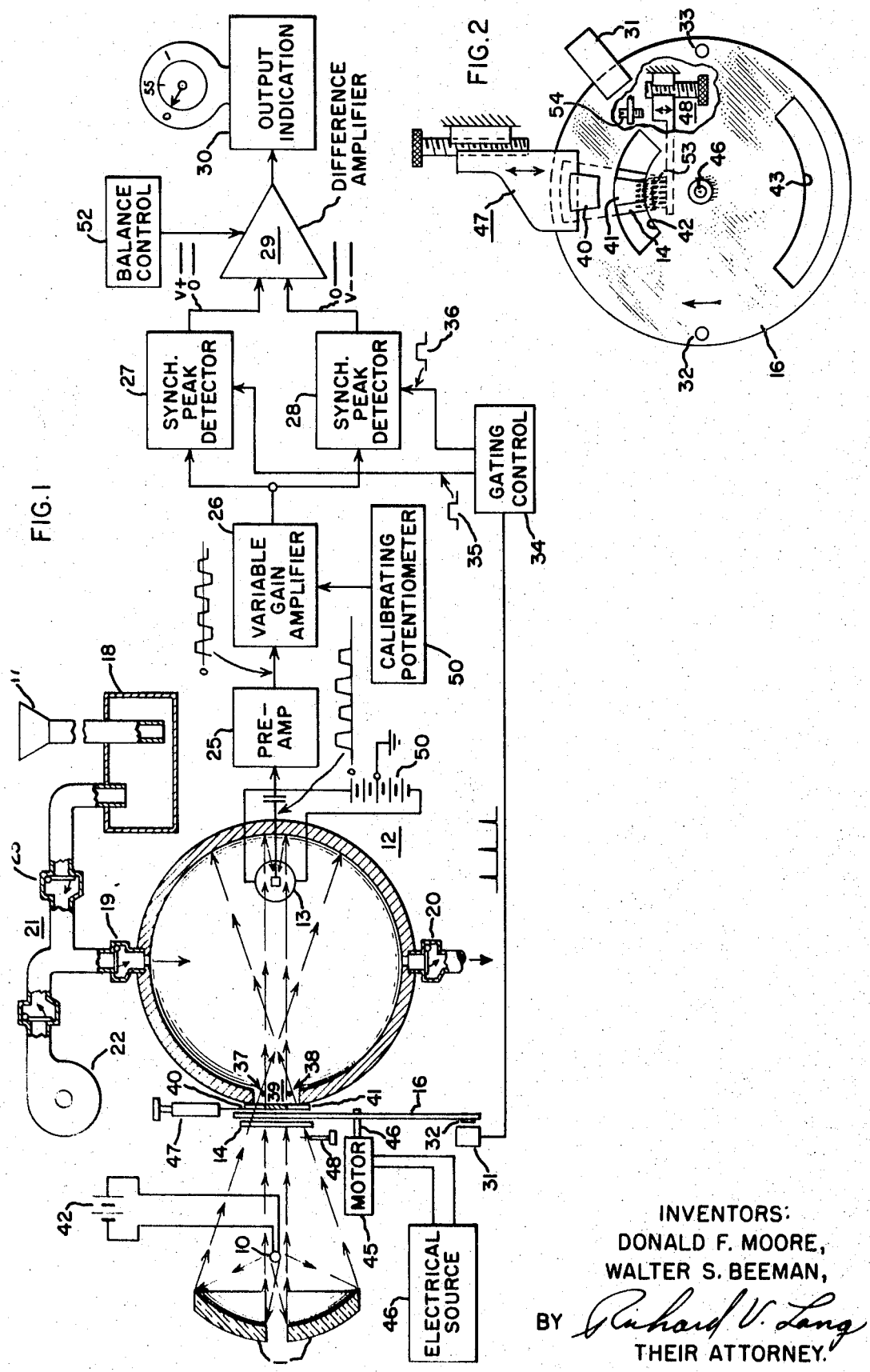

3,562,524

APPARATUS FOR MEASURING THE CONCENTRATION OF ALCOHOL VAPOR IN ALVEOLAR AIR

BACKGROUND OF THE INVENTION

1. Field of the Invention

The invention relates to gas analysis apparatus employing infrared radiation absorption phenomena and employs optical comparison techniques. The invention is specifically applied to the detection of ethyl alcohol vapor and the measurement of this concentration in alveolar air. This measurement may be correlated with legally accepted standards of blood alcohol levels.

2. Description of the Prior Art

Airborne gaseous contaminants and gas generally have been identified by their infrared absorptive properties and the apparatus has often taken the form of an optical comparator. Intrinsically, such equipment requires long path lengths to achieve a reasonable degree of sensitivity. This requirement has usually prevented extensive use of such devices where the gaseous unknowns were available in only small samples. Where a relatively simple device was desired for testing alcohol on the breath, such as a portable device for use at the point of arrest, the principle seems not to have been employed. Instead, a method depending on chemical techniques has been used for this application. Portable chemical devices have been crude in yielding magnitude data and usually have required later confirmation. Laboratory type analysis equipment employing infrared techniques has been available, but it has not been specific to alcohol, and has ordinarily required trained personnel, both for interpretation and operation, and it has not been suited for portable operation.

SUMMARY OF THE INVENTION

It is an object of the present invention to provide an improved apparatus for the detection of alcohol vapor on the breath.

It is a further object of the present invention to provide a novel alcohol detector employing the infrared absorption principle, and suitable for portable use.

It is still another object of the present invention to provide an improved alcohol detector employing infrared absorption, having improved means of achieving large absorptive path lengths in small overall dimensions.

It is still another object of the present invention to provide in an optical comparison gas-analysis apparatus, improved means for alternating the spectral content of the applied radiation while providing optically identical paths of multiplied path lengths.

It is a further object of the present invention to provide in an infrared gaseous detector improved filter means specifically adapted for alcohol vapor detection.

It is an additional object of the invention to provide in an improved alcohol detector employing infrared absorption improved calibrating means.

These and other objects of the invention may be achieved in accordance with the invention in novel alcohol detection apparatus comprising a source of infrared radiation, an absorption chamber into which alcohol vapor may be introduced and which forms a light-integrating sphere, optical means including a split ellipsoidal mirror developing two separated beams of infrared radiation focused at two adjacent points within said chamber, first and second filter means, each interposed in the path of one of said beams, and a slotted chopper wheel for alternately operating said beams.

Novel natural filter means for alcohol detection are provided comprising vinyladene chloride-vinyl chloride copolymer, polytrifluoromonochlorocthylene, supplemented by a general blocking filter employing a wave interference element and crystalline calcium fluoride. A masking arrangement is provided for achieving optical balance, and for secondary calibration of the desired alcohol levels.

BRIEF DESCRIPTION OF THE DRAWING

The novel and distinctive features of the invention are set forth in the claims appended to the present application. The invention itself, however, together with the further objects and advantages thereof may best be understood by reference to the following description and accompanying drawings, in which:

FIG. 1 is an illustration of a first embodiment of the invention for the detection of ethyl alcohol vapors.

FIG. 2 is a plan view of the filter and chopper assembly employed in the first embodiment;

DESCRIPTION OF THE PREFERRED EMBODIMENT

Figure 3A:
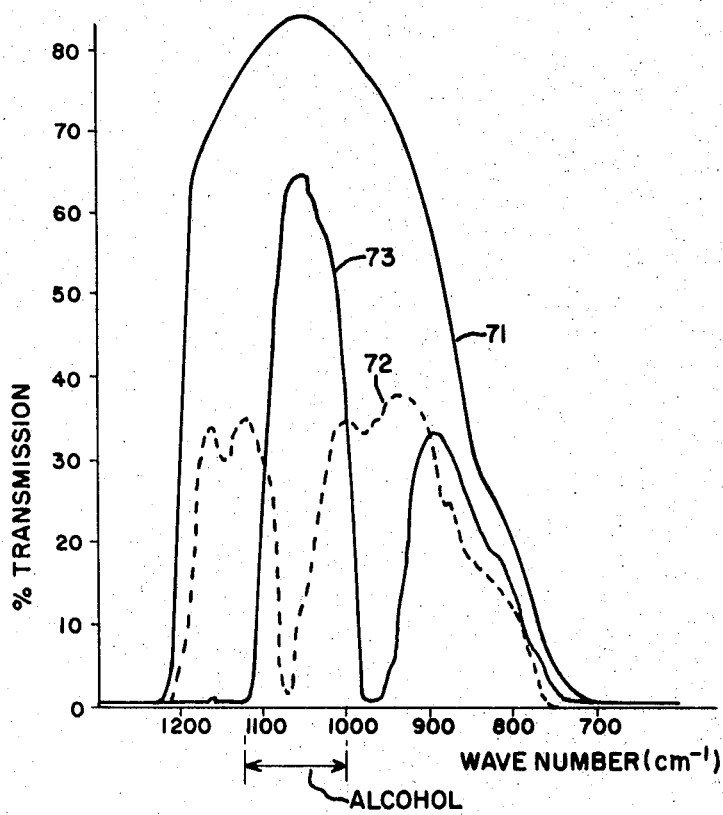
FIG. 3A is a graph illustrating the percentage of transmission as a function of wave number of the optical filters employed in the first embodiment.

A first embodiment of the invention is illustrated in FIGS. 1 and 2. The optical and mechanical features of the invention are shown in cross section with the principal electrical circuits being shown in a simplified block diagram in FIG. 1. FIG. 2 is a more detailed showing of certain mechanical features. The apparatus depicted measures the presence of alcohol vapor in a sample of breath supplied by an individual and an electrical output is produced which indicates the alcohol concentration. These measurements are used to indicate the level of alcohol present in an individual's respiratory system, and by inference produce an indication of the extent to which he may be under the influence of alcohol.

The principal optical and mechanical parts of the invention perform the function of passing two spectrally distinct kinds of infrared radiation through a sample of the breath. The spectral properties of the radiation are thus selected to take advantage of the absorptive phenomena peculiarly characteristic of alcohol vapor. In passage through the sample, any initial balance in measured intensity between the two kinds of radiation is then altered in proportion to the amount of alcohol present in the sample. The altered balance in intensity is then sensed by an infrared detector producing an electrical output, which may ultimately be interpreted in terms of the amount of alcohol present.

The optical parts include a source 10 of infrared radiation; a split ellipsoidal mirror 11 arranged to direct infrared radiation in two distinct beams into an integrating sphere—absorption chamber 12; a thermistor bolometer infrared detector 13, which measures the level of infrared radiation within the integrating sphere; a set of filters 14, 40, 41 for adjusting the intensity and spectral content of the radiation introduced into the integrating sphere, the filter set 40, 41 having dissimilar upper and lower portions upon which the two beams separately impinge to produce two distinct kinds of radiation within the sphere; and finally, a shutter 16 introduced between the source 10 and the integrating sphere 12 for alternately exposing the upper portion and then the lower portion of the filter set 40, 41 to the radiation source, and thereby alternate the spectral content of the infrared radiation.

The mechanical parts for sampling the breath and for maintaining the samples within the integrating sphere—absorption chamber comprise a mouthpiece 17 and a moisture trap 18 leading through tubing into an input orifice which is valved at 19. An output orifice, also valved, is provided at 20. The valves 19 and 20 are flutter or puppet valves which assume a normally closed position under the influence of a resilient closure member and open under slight pressure from the mouthpiece 17 to permit the introduction of a quantity of alveolar air. After the momentary introduction of this air, the valves close to trap a quantity of the air within the integrating sphere for infrared examination.

An additional connection in the form of a T is made at 21 to the tubing between the moisture trap 18 and the entrance valve 19 for connection to a small electrically driven or hand-operated pump 22 for purging the integrating sphere 12. A valve 23, which is normally open, is introduced between the T and the trap 18 and is arranged to close under pressure directed from the pump 22. Thus, when the pump 22 is actuated, the purging air is forced down through the inlet valve 19, through the integrating sphere 12 and out of the system through the valve 20. The pump 22, to avoid diversion of the breath sample when the pump is not is use, should either be of a closed design or be provided with unidirectional valving similar to valve 23.

The electrical features of the apparatus amplify the electrical signal from the infrared detector 13, synchronously develop two electrical signals, one corresponding to infrared radiation of the first spectral content passing through the upper part of the filter set 40, 41 (which will hereafter be termed the reference beam) and the other to infrared radiation passing through the lower part of the filter set 40, 41 (which will hereafter be termed the analytic beam) and then derive an output electrical quantity which is proportional to the difference between these signals, standardized against certain variations and suitable for display.

The electrical signal processing circuit principally comprises the infrared detector 13 upon which the alternating illumination falls, a preamplifier 25 arranged to amplify the signal to a convenient level, a variable-gain amplifier 26, in which the signal level derived from the optical source is standardized prior to taking a difference; a pair of independent synchronized detectors 27, 28, one of which develops a voltage corresponding to the light intensity of the analytic beam and the other to the reference beam, and finally the difference amplifier 29 which obtains a signal proportional to the difference between the two signals at the detectors 27 and 28. This output voltage may be used to control an output indicating device 30 such as a recorder or a galvanometer.

The synchronization of the electric signal developed in the detectors 27, 28 with the alternating reference and analytic illumination of the sphere is performed jointly by a magnetic position sensor 31, two magnetic slugs 32, 33 mounted upon the perimeter of the chopper wheel 16 and passing near the sensor 31 and the gating control 34. The gating control 34 develops square wave output pulses as shown at 35 and 36, used to alternately turn on and off the synchronized detectors 27 and 28 in accordance with the position of the chopper wheel. In this manner the detection periods are timed with illumination of one or the other of the filter sections corresponding to reference and analytic illumination.

Having summarized the principal features of the inventive embodiment, it may now be considered in somewhat greater detail. The illumination system includes the light source 10 arranged in front of the split ellipsoidal mirror 11. The ellipsoidal mirror 11 may be formed either as a single ellipsoidal mirror which is split in the center during manufacture and the two parts then separated to form a mirror having two distinct adjacent focii, or the mirror may be a low cost casting formed initially to have these optical properties. The light source 10 and mirror 11 are positioned to image the light source at the points 37, 38 just inside an aperture 39 on one face of the integrating sphere 12. By this arrangement two separated focused beams of light are formed, one passing through the blocking filter 14 and then falling on the upper portion 40 of the filter set and the other also passing through the blocking filter 14 and then falling on the lower portion 41 of the filter set.

The light source 10 is an incandescent source composed of electrically heated resistance material, and heated to a temperature of approximately 900° C. by a DC source 42. It provides wide band infrared radiation extending to either side of the 10-micron region. The electrical source 42 should have a stable voltage in order to maintain the radiation temperature and light intensity of the light source 10 approximately constant. Adequate stability can be achieved either by use of an intrinsically stable voltage source or by stabilization or compensating adjustment of a less stable source. An exemplary infrared source employs a platinum-rhodium alloy filament, typically formed from several inches of 3-mil diameter wire. The wire may be coiled into a helical coil of 1/10 -inch diameter and sealed within a passive shell of $Al_2O_3$. This design permits operation of the source 10 in open-air environments without degradation of the radiation quality or intensity. The use of a small diameter permits smaller system optics and generally simplifies their design.

After entrance into the integrating sphere-absorption chamber 12 through the blocking filter 14 and the respective halves of the filter set 40, 41 the separate entrant beams, focusing at 37 and 38 respectively, pass through the atmosphere contained in the integrating sphere 12, strike the remote wall of the sphere, and are diffusely reflected, by the wall, to another portion of the interior wall. To aid the diffusion process, the sphere may be provided with scattered surface irregularities. The process of reflection is repeated a large number of times. In the process, the original beams of light become widely diffused and develop a nearly even level of illumination throughout the sphere. To avoid direct illumination of the detector 13, it is inserted off the axis of the inserted light at a site which is approximately symmetrical in relation to the entrant beams. The approximate position of the detector 13, however, is not critical because of the near uniformity of illumination. For efficiency, the interior surfaces of the integrating sphere should be highly reflective to infrared illumination in order to increase the number of effective reflections.

In order to minimize the problem of moisture condensation, the sphere is ordinarily maintained at a temperature approximating or slightly higher than the temperature of the introduced breath samples. A sphere of approximately 3 inches in diameter is suitable and will provide an effective path length of several feet, depending upon surface reflectivity. Such a path length permits appreciable infrared absorption and in the case of a vapor containing alcohol, provides a very sensitive measurement of its presence. Thus, by use of an integrating sphere a very large path length can be accommodated within small physical dimensions, and the convenience of the apparatus is greatly enhanced.

Considering now the filter—chopper wheel arrangement, which is illustrated in FIGS. 1 and 2, the filters 14 and 40, 41 together with the chopper wheel 16 provide a simple technique for introducing two infrared illuminations of differing spectral content (the analytic and reference illumination) in rapid succession into the integrating sphere. The filtering properties of the blocking filter 14 will be further discussed below. The filter 14 may be of generally rectangular outline, as illustrated in FIG. 2, and should be dimensioned to intercept all the illumination passing into the integrating sphere from the light source 10, 11. The second filter set is disposed overlying 14, as illustrated in FIG. 2, and consists of two parts; the upper part 40 which functions as the reference filter and the lower part 41 which functions as the analytic filter. These two parts are disposed in the two beams focused at 37, 38, respectively.

The chopper wheel 16 is circular, is mounted for rotation about its center, is introduced between the filter 14 and the filter set 40, 41 and is of an opaque material. It is provided with two circular slots 42 and 43 which as the chopper wheel rotates, successively expose first the lower analytic filter 41 and then the upper reference filter 42 to the two beams from infrared source 10, 11.

The chopper wheel 16 is rotated about a central axis 44 by means of an electrical motor 45, energized by an electrical source 46. A constant speed drive is preferable, rotating at about 1,200 r.p.m. to produce 40 cycle alternating illumination. The two circular slots 42 and 43 are placed at diametrically opposed positions on the chopper wheel and are arranged at the radial distances from the center of rotation required to bring them into radial alignment with the filter sections 40 and 41. In the position shown in FIG. 2, the lower analytic filter 41 is exposed since the slot 42 is passing over it.

When the chopper wheel has been rotated 180° from the position shown, the upper reference filter 40 will be exposed by the slot 43. The central angle subtended by the slots 42 and 43 are both approximately 90°, which allows an angular separation between slots, also of approximately 90°. This dimensioning permits the light passing through one slot to be completely extinguished before the light is initiated through the other slot.

The amount of light and to a lesser extent the duration of the light entering the filter sections 40, 41 should be closely controlled. To achieve these ends, the slots 42, 43 are of a prescribed width dimension and they embrace a prescribed central angle on the chopper wheel. The areas of the filter sections 40, 41 which are exposed by the slots 42, 43 are preferably slightly unequal, with the reference filter being provided with an adjustable masking mechanism 47, which as will subsequently be explained, is used to balance the light admitted into the system through the two filter sections. Ordinarily the inequality need only exceed the probable errors bringing about an inequality and may be limited to adding 10 percent to the area of the reference filter. The filters 40, 41 themselves, therefore, have a vertical dimension corresponding to the widths of the slots 42 and 43 and may be masked to expose sector shaped regions embracing a common central angle as illustrated in FIG. 2, measured from the axis of rotation of the chopper wheel.

The shape of the turn-on, turn-off ramps (the time dependent rate of light increase and the time dependent rate of light extinction at the beginning and ending of each filter exposure) is relatively unimportant. While it may slightly affect the total amount of illumination introduced during one exposure, the subsequent electrical system is designed to respond primarily to peak illumination rather than to average or total illumination.

As indicated above, the slots 42, 43 on the chopper wheel 16 are arranged to permit the light to be completely extinguished in one filter section prior to its application to the other filter section and the period of extinction is approximately equal to the period of illumination. This choice produces a 50 percent duty cycle and has the advantage of taking maximum advantage of the intrinsic time limitation due to the optical detector's time constant. An optical detector which is suitable for this application may take the form of a negative temperature coefficient resistance bridge inserted in a suitable enclosure having a window permitting infrared radiation to heat one resistance element. For compensation against ambient temperature affects, a similar negative temperature coefficient element is provided in the same enclosure but shielded from infrared radiation. With the two arranged in a bridge, the difference in resistivity may be used to develop a small voltage indicative of the momentary infrared radiation intensity.

Infrared detectors are commercially available which can be operated at cyclical rates as high as 100 cycles per second, but in view of their cost it is usually preferable to employ a lower cyclical rate, which in the present practical embodiment is conveniently 40 cycles per second.

The present apparatus measures the amount of alcohol vapor present by electrically detecting a change in balance in the illumination passing through the sphere 12 and falling on the optical detector 13. The shutter 16 and filters 14, 40, 41 sequentially introduce light of first one spectral content and then of a second spectral content. The optical detector 13, in combination with subsequent electrical processing circuitry, then detects a difference in the balance between these two kinds of radiation. In a preferred adjustment, the system is optically balanced when no alcohol vapor is present and is imbalanced in the presence of alcohol vapor. The initial light balance is achieved in part by control of the areas of the filters, in part by control of the shutter 16 operation, and in part by control of the spectral response of the filters, which will now be considered in greater detail.

The filters 14, 40, 41 are accordingly selected specifically for the detection of alcohol vapor. A study of the infrared absorption spectrum of ethyl alcohol discloses a deep absorption band in the region of 1,070 wave numbers (cm.$^{-1}$). This absorption band extends through a range of approximately 1,000—1,120 wave numbers. This peak is a specific property of ethyl alcohol and one that is not shared by other vaporous chemical substances commonly on the breath, although others such as water vapor are near it (about 950 wave numbers).

The blocking filter 14 passes infrared radiation lying within the general region of interest but excludes radiation outside its pass band. It is a composite filter employing both an interference filter component and a natural filter component. Its spectral response is illustrated in FIG. 3A in the continuous line 71. Generally, the filter passes a band of radiation lying between 1,200—800 wave numbers. The steeply rising characteristic in the vicinity of the wave number 1,200 is achieved by the interference filter component of the blocking filter 14. This wave interference filter is of conventional design, exhibiting a sharply rising low pass characteristic. It typically consists of multiple transmissive layers of specially selected indices of refraction and appropriate thicknesses for the frequency cutoff desired. The remainder of the spectral response produced by the blocking filter 14 is controlled by the natural filter component which consists of a thin optically transparent layer of crystalline calcium floride ($CaF_2$). The blocking filter is broader than the ethyl alcohol absorption band to permit passage of both the 1,070 peak and a margin of unabsorbed radiation on both sides of this peak.

The analytic filter 41 and the reference filter 40 are also selected to utilize this absorption peak of ethyl alcohol. In particular, the analytic filter 41 generally passes radiation in the peak region while rejecting radiation to one side of it, while the reference filter 40 rejects radiation in the peak region, but generally passes radiation on one or both sides of it. The spectral response of two practical filters is illustrated in FIG. 3A with the composite response of the reference filter 40 and blocking filter 14 being illustrated in the dashed line 72, while that of the analytic filter 41 and blocking filter 14 is shown in a continuous line 73.

In order to achieve an optical balance (in the absence of alcohol vapor) the thru-put energies through the two transmission curves are made approximately equal. (The areas under the curves give an approximate but distorted indication of these energies.) This balance occurs when the sensor 13 produces equal electrical outputs whether filter 40 or 41 be illuminated.

Once infrared radiation from the source 10, 11 has passed through the filters 14, 40, 41, it will assume the spectral distribution imposed by the filters. As the graphs in FIG. 3A indicate, the radiation passing through the analytic filter 41 will mostly fall within the absorption band of any alcohol present in the integrating sphere. Similarly, the infrared radiation passing through the reference filter 40 generally lies outside of this absorption region. When these filters are appropriately balanced (with no alcohol vapor present) as by the use of additional neutral filters, the detector 13 responding to all the incident radiation will measure equal values whether the analytic filter 41 or the reference filter 40 is in place and thus be balanced.

When alcohol vapor is present within the integrating sphere—absorption chamber 12, the prior optical balance (as measured at the detector 13) will be upset proportionately. This follows since the radiation passed by the reference filter 40 falls outside the alcohol absorption band and is substantially unaffected, while the radiation passed by the analytic filter 41 falls within the alcohol absorption load and is substantially absorbed. The amount of optical imbalance thus becomes a measure of the amount of alcohol vapor present.

The filters 40, 41, whose characteristics are illustrated in FIG. 3A, are both natural filters. The reference filter 40 may consist of a thin layer (several thousandths of an inch) of vinyladene chloride-vinyl chloride copolymer (80/20) also known as "Saran" supplemented by a thin layer of polyethylene. The polyethylene is a neutral filter introduced to provide optical balance with the analytic filter, while the "-

Saran" has the illustrated spectral selectivity. The attenuation notch measured at the .5 absorbance (a characteristic not illustrated in FIG. 3A) extends from 1,030 to 1,090 and thus removes a major portion of the radiation under the alcohol 1,070 peak. At the sides of this notch, the absorbance decreases to between .2 and .1. Viewed in terms of total radiation admitted through the combination of the blocking filter 14 and the reference filter 40, about one-fifth falls within the alcohol peak and four-fifths outside of it — in effect producing an approximate band exclusion filter.

The analytic filter is formed of a thin film (also a few thousandths) of polytrifluoromonochloroethylene (Kel-F) which has a sharp transmission peak between 1,000 and 1,100 wave numbers. It also has a secondary peak of lesser transmissivity centering at 900 wave numbers. The total radiation thus falls approximately three-fifths within the alcohol absorption peak and two-fifths outside — in effect forming an approximate band pass filter.

Accordingly, assuming by way of approximate illustration that the introduction of an alcohol vapor achieves a 10-percent light attenuation, the illumination in the reference filter would be reduced only approximately 2 percent while that passing through the analytic filter will be reduced 6 percent. (The foregoing percentages depend very much upon the particular application and may be either greater or smaller than those FIGS. cited above.) Because of the greater reduction of the analytic illumination than the reference illumination, a comparison of the two readings produces a net difference, where value is dependent on the amount of alcohol vapor present within the hemisphere 12.

The foregoing filter design is relatively cheap in that the chemical materials are common industrial chemicals and exhibit quite marked optical properties which uniquely adapt them to the detection of alcohol vapor. Thus the only filter which is not a "natural" filter is the wave interference portion of the blocking filter 14. The filters 14, 40, 41 so far described are of considerable simplicity and are easily fabricated.

Figure 3B:
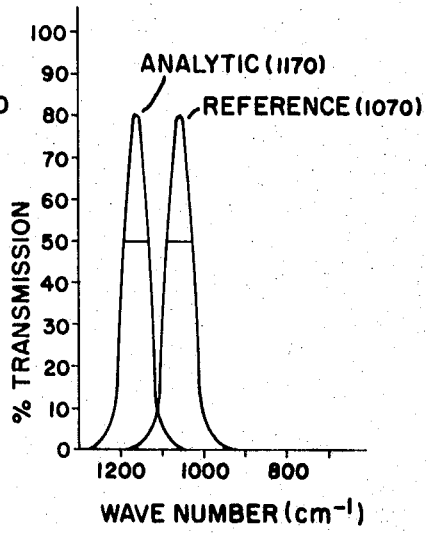
FIG. 3B is a corresponding graph illustrating the optical properties of alternate filters.

If somewhat greater expense is permissible, one may employ interference-type band pass filters for the analytic and reference filters. In this case, illustrated in FIG. 3B, the frequency of the analytic filter should center at 1,070 wave numbers (the alcohol absorption line) and the center frequency of the reference filter should center at approximately 1,170 wave numbers. Locating the reference filter at a shorter wavelength insensitizes the device to a water vapor absorption peak that occurs at slightly lower wave numbers. The filter characteristic is illustrated at FIG. 3B. Ordinarily in this arrangement a blocking filter is unnecessary.

Whether natural or interference filters are employed, Applicants' technique of employing a split ellipsoidal mirror which then focuses the illumination immediately behind the analytic and reference filters permits the use of quite small devices and is thus an economical design. Use of an integrating sphere—absorption chamber with the split mirror permits the illuminating beams to arrive at the simple detector 13 through essentially equal but random paths through the sample.

The operation of the electrical system which performs the comparison between the light passing through the reference and analytic filters and thereby provides a measure of the alcohol vapor present in the integrating sphere—absorption chamber 12 will now be described. The electrical system's principal parts and principal functions were summarized earlier. The circuit design may be straightforward. The frequency limitations are readily accommodated since the cycling rate of the chopper wheel 16 superimposes the information on a 40 cycle per second pulse and amplifier bandwidths of from 1 to 1,000 cycles are quite adequate. Ordinarily the pulse at the output of the bolometer is unidirectional, but it may be AC amplified in the preamplifier 25. Because the duty cycle is approximately 50 percent and because the modulation of alternate cycles is a small factor, the DC shift between adjacent cycles is so small as to be negligible. Thus the signal at both the input and output of the preamplifier 25 may be regarded as a 40-cycle wave form with alternate cycles having an alternating and lower amplitude as shown at 56.

For optimum sensitivity and signal-to-noise ratio, the preamplifier 25 may employ a field effect transistor or other low-noise, small-signal devices. The amplifier 25 should be linear and a gain of 5,000 is typical. It should amplify the signal well above ordinary operating noise. The variable gain amplifier 26 may be a conventional linear amplifier, requiring means such as a potentiometer 50 coupled in a signal voltage dividing configuration for adjusting the output signal to an arbitrary amplitude. The potentiometer permits the signal level to be standardized to take account of various sources of generally longterm inaccuracies. Such inaccuracies include those due to gradual loss of brightness of the source 10, gradual dulling or dirtying of the surfaces of the optics, and the like.

The variable-gain amplifier 26 is then coupled to a synchronized detector 27 and to a synchronized detector 28, both of which respond to the gating control 34. As previously described, the gating control 34 may take the form of a simple flip-flop which generates square wave output pulses 35, 36 for 50-percent duty cycles under the control of the chopper wheel position, sensed by the trigger pulse producing elements 31, 32. The pulses 35, 35 thus control the detection periods of the detectors and synchronize them with the periods that a given filter is being illuminated: detector 27 being used with the analytic illumination and detector 28 with the reference illumination.

The synchronized detectors are of conventional form and may consist of a separate input gate followed by a peak detector, the output of each referenced to ground. Since readings are desired within perhaps one-half minute or so, the peak detectors should have a time constant large enough to integrate or average successive odd (or successive even) peaks coming in at a 20-cycle rate and a time constant small enough to respond within a desired reading interval. Typically, the time constant should lie within the range of from 1 to 10 seconds. The use of a peak detector has the advantage of making the system insensitive to slight changes in the duration of the illumination period or to the turn-on, turn-off ramps. Since the system is designed to provide an approximately square wave pulse of illumination tapering only slightly at the beginning and the ending of the illumination period, this confines the accuracy requirement in the mechanical chopper to holding the width of the illuminating slots 42, 43 to a constant value.

The difference amplifier 29 is provided with two different DC levels from the peak detectors 27, 28, both referenced to ground. In taking a difference, the difference amplifier may ordinarily respond at approximately the same time constant as the synchronized detectors. The difference amplifier 29 should be provided with a balance control 52. This balance control, indicated at 52, may be a potentiometer in a signal voltage dividing configuration. The difference amplifier produces a DC output voltage which is then fed to the output indication means 30. Since the time constants of the preceding circuitry are relatively long and consequently the signal changes relatively slow, a conventional galvanometer indicator or a recording-pen type of output indicator are appropriately fast for signal indication.

The system is calibrated in the following manner. Calibration brings into play the calibration potentiometer 50, the indicator 30, the balance control 52 and two optical adjustment means 47 and 48. These features permit the system to be self-calibrated against most gradual errors.

To achieve an initial optical balance, the initial calibrating adjustment, the integrating sphere is purged so that only air is present in it. The system is illuminated and the chopper wheel is set into operation. As it operates, the illumination is split by the ellipsoidal mirror and passes through the separate analytic and reference filters and is sequentially detected by the infrared detector 13. The signal is then amplified through the amplifiers 25, 26, separately detected in the detectors 27, 28, fed separately to the difference amplifier 29 and then displayed at the output indicator 30. The balance control 52 is initially set at zero so that the difference amplifier operates without favoring one input over the other and one examines the output indicator 30 for any departure from zero. If the output indication at 30 is not zero, system imbalance is indicated. Since the electrical signal processing is common up to the detectors, one may conclude that more illumination is coming through one filter than through the other. The adjustable mask 47 is thereupon advanced to the point where the output indication is at or as near zero as the adjustment will permit. At this point, the balance control 52 is further adjusted to improve the zeroing of the instrument. The optical adjustment will ordinarily be somewhat more coarse than the subsequent electrical adjustment, particularly in view of the intervening gain. Accordingly it is ordinarily desirable to have both adjustments, with the electrical adjustment being in part a vernier adjustment on the coarser optical adjustment, and in part an output indicator zeroing adjustment.

Having now balanced the radiation entering the sphere 12 and set the electrical indicator 30 at zero, one may next proceed to calibrate the scale range. Conditions are as before with the illumination on and the sphere 12 filled with air. This adjustment standardizes the signal level against which the subsequent difference is compared, and permits one to treat the difference readings as percentages.

This final adjustment is provided by the calibrating mask 48 illustrated in FIGS. 1 and 2. This mask is interposable between the lower beam from the source 10 and the lower portion of the blocking filter 14. It consists of a screw adjusted comb-shaped mask 53 supported at the margin of the blocking filter 14. A stop 54 is provided which is ordinarily set at the factory, and which limits the inner protrusion of the mask 53. The outer range of adjustment of the comb mask 53 permits it to be completely withdrawn from interference with the lower beam. In normal use it is withdrawn. When used for calibration, it may be inserted into the beam so as to reduce the total illumination passing into the analytic filter 41 a preassigned amount and this amount is preset by the stop 54.

The factory adjustment of the stop 54 is ordinarily established at the minimum level at which legal significance attaches to the alcoholic content of any contained vapor. Assuming that for legal purposes a 3-percent diminution in analytic illumination is produced when the air under test has this predetermined alcoholic content, then the output indicator means 30 is provided with a fixed calibrating line 55 at this minimum level. The stop 54, once the calibrating line 55 has been established, is then adjusted in the factory so that it also will return the indicator to the calibrating line 55 when the sphere 12 is free of contamination. The practical effect of advancing the comb mask 53 is to reduce the intensity of the illumination passing through the analytic filter 41 and impinging on the infrared detector 13 by the very same amount that the legally significant concentration of alcohol vapor within the sphere 12 would reduce this intensity. In other words, the light-absorbing effect of the comb mask is made equivalent to the absorbent effect of a prescribed alcoholic vapor concentration.

This adjustment calibrates the system against inaccuracy, both in the optical and electrical portions of the system, including both changes in light intensity and changes in gain in the amplifiers.

The calibrating line 55 should fall at about half scale position. The maximum reading at full-scale position will ordinarily embrace the maximum expected alcohol concentration and is usually somewhat under the lethal limits. The advantage of calibrating at the minimum legal limit is that this point is of greatest practical concern and by calibrating at this point scale distortions are eliminated. When several levels of alcohol are legally significant, then a plurality of such calibrating devices may be employed. However, this measure is usually unnecessary since the prior precautions achieve comparable scale accuracy throughout the useful range of the equipment. Once the instrument is calibrated, the comb mask 48 becomes a secondary standard against which the instrument may be frequently checked. The output indicator 30 may be scaled in terms of "percent blood alcohol" to allow direct reading of this value.

Although the invention has been described with reference to specified practical embodiments, it will be appreciated that various modifications may be made by those skilled in the art without departing from the spirit and scope of the invention.

We claim:

1. A gas-analysis apparatus comprising:
   a. a source of radiation;
   b. an integrating sphere—absorption chamber having a port into which a gas may be introduced for analysis and reflective interior surfaces providing a multiplied-length optical path suitable for infrared absorption;
   c. optical means illuminated by said source for developing two separate beams, focused at two adjacent points proximate to said chamber and directed into said chamber;
   d. infrared detection means upon which radiation not absorbed in said chamber impinges for measurement of said infrared radiation after absorptive passage through said chamber;
   e. first analytic filter means disposed in one of said beams and passing a narrow band of infrared radiation coincident with a narrow absorption peak of said gas to be analyzed;
   f. second reference filter means disposed in the other of said beams and passing infrared radiation substantially unabsorbed by said gas under analysis; and
   g. shutter means disposed in both said beams for periodically interrupting said beams so as to introduce them in alternation within said chamber.

2. The apparatus set forth in claim 1 wherein said optical means is an ellipsoidal mirror along the axis of which said source is disposed, said mirror having two like adjacent reflective surfaces for focusing two equal intensity beams from said source to said two adjacent points.

3. The apparatus set forth in claim 2 wherein said ellipsoidal mirror is of generally circular cross section, and said adjacent reflective surfaces are of semicircular cross section.

4. The apparatus set forth in claim 1 wherein said first and second filter means are each disposed in proximity to one of said adjacent two focus points.

5. Apparatus as set forth in claim 1 for analysis of ethyl alcohol vapor in air wherein said first analytic filter means comprises a natural filter of polytrifluoromonochloroethylene film having a light transmission peak at approximately 1,070 wave numbers and a band pass filter embracing said 1,070 wave number region having a broader pass band than said natural filter; and wherein said second reference filter means comprises a natural filter of vinylidene chloride-vinyl chloride copolymer providing a light attenuation notch in the vicinity of 1,070 wave numbers and a band pass filter embracing said 1,070 wave number region having a broader pass band than said first recited natural filter.

6. The apparatus set forth in claim 5 wherein said band pass filters comprise a natural filter of crystalline calcium fluoride and a long wave pass, interference filter having a cutoff at approximately 1,200 wave numbers.

7. The apparatus set forth in claim 1 especially adapted for identifying a gas by its absorption characteristic, having in addition thereto a calibrating means comprising a translatable mask, translatable at will from a point outside said one beam to a preassigned position in said one beam to simulate the absorption of a predetermined concentration of said gas.

8. The apparatus set forth in claim 1 wherein said means for periodically interrupting said beams comprises a rotatable opaque disc having circular slots arranged to alternately turn on said beams and to intersperse said periods of illumination with equal duration periods to nonillumination to provide a duty cycle of approximately 50 percent.

9. The apparatus set forth in claim 8 having in addition thereto synchronized electrical detection means coupled to said detection means for deriving a first electrical signal corresponding to radiation measured by said detection means passing through said first filter means and for deriving a second electrical signal corresponding to radiation measured by said detection means and passing through said second filter means;

means to take the difference between said first and second electrical signals; and output indication means responsive to said difference signal.

10. The apparatus set forth in claim 9 wherein inner and outer edges of said circular slots are concentric circles to provide constant slot width and filter exposure as said disc is rotated; and wherein said synchronized electrical detection means are peak detectors having a time constant substantially greater than the rate of interruption of said illumination so as to provide an electrical output signal independent of minor fluctuations in illumination duration.

11. Apparatus for the analysis of ethyl alcohol vapor in air comprising:

a. a source of infrared radiation;

b. a band transmission filter illuminated by said source for restricting transmitted radiation to a band extending from approximately 1,200 to 800 wave numbers at the 4-percent transmission point;

c. a first analytic filter of polytrifluoromonochloroethylene film having a light transmission peak at approximately 1,070 wave numbers;

d. a reference filter comprising a natural filter of vinylidene chloride-vinyl chloride copolymer providing a light attenuation notch in the vicinity of 1,070 wave numbers;

e. an absorption chamber into which said vapor may be introduced subjected to illumination passing through said band transmission filter and said analytic filter and through said band transmission filter and said reference filter; and f. means for comparing the attenuation of radiation that has passed through said analytic filter with the attenuation of radiation that has passed through said reference filter.

12. Apparatus as set forth in claim 11 wherein said band transmission filter comprises a natural filter of crystalline calcium fluoride and a long wave pass, interference filter having a cut off at approximately 1,200 wave numbers 13. The apparatus set forth in claim 1 having in addition thereto a mask translatable into one of said beams for adjusting the illumination in one beam in relation to the illumination in the other.